3,472,925
METHOD FOR PRODUCING INTRICATELY SHAPED ELECTRICAL INSULATION
David H. Reighter, Roslyn, Pa., and Robert L. Stratton, North Cape May, N.J.; said Reighter assignor, by mesne assignments, to I-T-E Imperial Corporation, Philadelphia, Pa., a corporation of Delaware
No Drawing. Continuation of application Ser. No. 572,697, Aug. 16, 1966, which is a continuation-in-part of application Ser. No. 241,041, Nov. 29, 1962. This application Oct. 26, 1967, Ser. No. 678,454
Int. Cl. B29c 13/00, 25/00; B29h 3/04
U.S. Cl. 264—236   5 Claims

ABSTRACT OF THE DISCLOSURE

A method for producing intricately shaped electrical insulation constituted of a thermosetting material incorporating, as the resinous component thereof, a polyvinyl halide plastisol and an epoxy resin in the proportion of from 1.8 to 4.3 parts by weight of the plastisol per part of the epoxy resin. The method involves heating a bath containing the thermosetting composition to temperatures of from 105° to 115° F., and immersing a preheated mandrel in the bath upon which the thermosetting coating is buit up, mixing of the bath being terminated upon immersion of the mandrel therein. After coating build-up, the mandrel is removed from the bath, heated to temperatures of from 350° to 380° F. to effect a partial cure and thereafter cooled to permit removal of the insulating coating formed thereon and final cure of such insulation.

---

This application is a continuation of copending application Ser. No. 572,697, filed August 16, 1966, and now abandoned, which in turn is a continuation-in-part of application Ser. No. 241,041, filed Nov. 29, 1962, and now abandoned.

This invention relates to a novel method for producing intricately shaped electrical insulation, and more particularly to such a method by which insulating coatings constituted of thermosetting resinous materials may be prapared by dipping procedures, in a manner which will meet exacting requirements as to both the physical and electrical properties of the product insulation.

It is frequently necessary to prepare electrical insulation in intricate configurations for various specific purposes. Puffer tubes, for example, are hollow, having cylindrical surfaces terminating in outwardly flared portions, and are relatively expensive and difficult to produce employing conventional die-molding or similar operations. Similarly, it is relatively difficult and expensive, employing conventional moulding procedure, to prepare intricately shaped bus joint covers, such as are described, for example, in Perkins U.S. Patent 2,878,302 granted on Mar. 17, 1959, and owned by the assignee of the present invention.

Insulation of the type described must, in addition to processing an intricate configuration, also be flame-retardant and possess electrical, mechanical and chemical properties which will not deteriorate with repeated use under normal or adverse operating conditions. Such insulation could not heretofore be formed by dip-coating operations employing, for example, epoxy resin thermosetting coating compositions since such compositions do not build up sufficient coating thicknesses in single dip-coating operations. In order, therefore, to produce intricately shaped electrical insulation, whether of the rigid or flexible types, it has heretofore been necessary to utilize compression molding or casting techniques involving substantial capital investment requirements.

It is accordingly among the objects of the present invention to provide a method for producing flame-retardant, intricately shaped electrical insulation, which method may be readily practiced by relatively economical dip-coating procedures.

A further object of the invention is to provide such a method utilizing epoxy resin-containing thermosetting coating compositions which provide insulation of substantial thickness employing only a single dip-coating operation.

Other objects and advantages of the invention will be apparent from a consideration of the following detailed description thereof.

In accordance with the invention, intricately shaped insulation having thicknesses of at least about 150 mils and up to as much as ½ inch is produced in a single dip-coating operation, employing a thermosetting resinous coating composition incorporating, as a resinous component therein, a polyvinyl halide plastisol admixed with an epoxy resin in the proportion of from about 1.8 to 4.3 parts by weight of the plastisol per part of the epoxy resin. The method involves initially heating a liquid body of the thermosetting coating composition to a temperature of from about 105° to 115° F., agitating the liquid body to prevent settling of the components thereof while maintaining the rate of agitation such as not to introduce air therein, and thereafter immersing a pre-heated mandrel which has been coated with a release agent and whose external surfaces correspond to the configuration of the desired insulation, into the liquid body while simultaneously terminating agitation of the body in order to avoid entrapping air in the coating to be formed on the mandrel. The mandrel is maintained immersed within the heated liquid body for a period of from about 30 seconds to 2 minutes, and is thereafter removed from the dip-coating composition and heated at a temperature of from about 350° to 380° F. for a period sufficient to partially cure the thermosetting insulating coating thereon. Since the coating composition is flexible in the partially cured state and becomes rigid when finally cured, the mandrel is then cooled and the object readily stripped from the mandrel in this partially cured condition. The thus formed insulation is subsequently cured completely.

The dip-coating of a mandrel and the subsequent curing and removal of the formed coating to provide insulation is, broadly, known. However, as noted above, it has not heretofore been possible to readily effect dip-coating of such compositions constituted of thermosetting resinous materials, inasmuch as adequate thicknesses of such materials would not build up in a single dip-coating operation to provide insulation of adequate thickness. On the other hand, it has been found that insulation possessing thicknesses of at least about 150 mils and as much as ½ inch may be produced by a single dip-coating operation, employing the method of the present invention. Moreover, by utilizing thermosetting resinous coating compositions containing from about 1.8 to 4.3 parts by weight of a polyvinyl halide plastisol per part of an epoxy resin constituent, pre-heating the coating composition, and dip-coating and curing the coating, as set out more fully above, superior homogeneous insulation exhibiting high impact strength, hardness and flexural strength may be readily and efficiently produced.

The resinous component of the thermosetting coating composition utilized in the practice of the present invention may contain any of the epoxy resins and polyvinyl halide plastisols known to be useful in the art for coating purposes. Such materials are described, for example, in U.S. Patent 3,086,888 granted on Apr. 23, 1963, disclosing a thermosetting resinous formulation containing a mixture of a halogenated epoxy resin, a non-halogenated epoxy resin and a polyvinyl halide plastisol; and in abandoned application Ser. No. 209,211 filed on July 11, 1962, and disclosing an insulating composition including a mixture of non-halogenated epoxy resins or an epoxy resin produced by the epoxidation of an olefin with peracetic acid, with a polyvinyl chloride plastisol.

The epoxy resin constituent may thus comprise the reaction product of at least one polyhydric phenol with at least one epihalohydrin in an alkaline medium. Phenols which are suitable for use in preparing these resinous polymeric epoxides include those which contain at least two phenolic groups per molecule. Polynuclear phenols which have been found to be particularly suitable include those wherein the phenol nuclei are joined by carbon bridges such as, for example, bis(4-hydroxyphenyl)dimethylmethane (Bisphenol A), bis(4 - hydroxyphenyl) monomethylmethane and bis(4-hydroxyphenyl)methane. Epoxy resins thus formed are, in the uncured state, clear, light colored liquids having viscosities in the range of from about 5,000 to 16,000 cps. at 25° C. They have epoxide equivalents of from about 175 to about 210 and average molecular weights of from about 250 to 400. Such epoxy resins are cured at ambient or elevated temperatures to rigid infusible solids.

It is, however, particularly preferred to employ, as the epoxy resin constituent of the thermosetting composition hereof, a mixture of from about 50% to 75% by weight of an epoxy resin produced by the polyhydric phenol-epihalohydrin reaction with from about 25% to 50% by weight of a peracetic acid type epoxy resin produced by the reaction of peracetic acid with a cycloaliphatic substituted olefinic compound. The peracetic acid type epoxy resins preferably so utilized have the formula

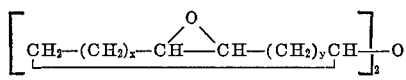

wherein x and y are each integers of from 0 to 4 and together equal from 1 to 4. Such resins are conventionally prepared by epoxidation of bis(cyclopentenyl)ether, bis (cyclohexenyl) ether or bis(cyclooctenyl)ether with peracetic acid.

The peracetic acid type epoxy resins are, in the uncured state, liquids having viscosities of from about 500 to 900 cps. (at 25° C.) and epoxide equivalents of from about 120 to 160. Such peracetic acid type epoxy resins are marketed under the designations "Bakelite ERL–2256" and "Bakelite ERL–2258" by the Union Carbide Plastics Company.

The polyvinyl halide plastisol provides the carrier for the thermosetting epoxy resin constituent which facilitates dip-forming of the thermosetting resinous insulation in accordance with the present method. The plastisol may conveniently comprise a polyvinyl chloride homopolymer, although it should be understood that copolymers of polyvinyl chloride with other copolymerizable vinyl monomers may similarly be utilized. Thus, plastisols formulated of copolymers of vinyl chloride with vinylidene chloride, with copolymerizable esters such as methyl methacrylate or ethyl methacrylate, or with vinyl esters of lower saturated aliphatic monocarboxylic acids, e.g., vinyl formate or vinyl acetate, may similarly be utilized in the practice of the present invention. Conventional plasticizers, e.g., the di(2-ethylalkyl)phthalates may also be incorporated in the plastisol constituent of the thermosetting coating composition.

The thermosetting compositions utilized herein additionally comprise those other ingredients designed to provide flame-retardant insulation having the necessary physical and chemical characteristics required for prolonged operation under the expected ambient conditions, including catalysts, hardeners, fillers and an antimony trioxide flame-retardant additive. Such materials are described more fully in the aforesaid patent and abandoned application, each of which is owned by the assignee of the present application and the pertinent disclosures of which are incorporated herein. Preferably, the thermosetting composition contains from about 0.6 to 2.5 parts by weight of the hardener, e.g., dodecenyl succinic anhydride, and from 0 to 0.03 parts by weight of the desired epoxy curing catalyst, e.g., dimethylaminomethyl phenol, per part of the epoxy resin constituent. The proportions of filler, e.g., silica flour, and flame-retardant additive, e.g., antimony trioxide, may be varied depending upon the desired viscosity of the coating composition and the desired flame retardancy of the product insulation. Generally, amounts of from about 1.5 to 2.2 parts of filler and from about 0.07 to 0.2 parts of antimony trioxide, per part of the epoxy resin constituent, have been found suitable for use in the dip-coating operations hereof.

The thermosetting composition to be employed in the practice of the present method is initially disposed in a dip tank which can be thermostatically controlled to maintain the composition at a temperature of from about 105° to 115° F. A suitable mixer must additionally be provided associated with the tank for circulating the insulating composition so that settling will not occur. For these purposes a water jacketed tank equipped with a suitable agitator or impeller is provided.

The heated body of the thermosetting composition is agitated within the dip tank at a rate sufficient to prevent settling of the ingredients of the composition yet not great enough to introduce air into the mixture. Into such mixture a mandrel having an external shape corresponding to the configuration of the insulation to be prepared is immersed, the mandrel having first been heated to a temperature greater than that of the liquid body, preferably to from about 350° to 380° F. If desired the mandrel, which may comprise any suitable metal such as copper, aluminum, kirksite (an alloy of 3.5% Cu, 4.0% Al, 0.04% Mg and the balance Zn) or the like, may (prior to immersion in the dip-coating composition) be coated with an appropriate mold release such as one of the many silicone greases known to those skilled in the art.

The agitation of the body of the resinous formulation in the dip tank is terminated just prior to dipping the heated mandrel therein in order to avoid entrapping air in the coating formed on the mandrel. The mandrel is carefully immersed in the coating material so as not to entrap air; if a minute volume is inadvertently trapped within the liquid body it may be dislodged by a slight oscillatory motion of the mandrel shortly after immersion thereof.

The mandrel is thereafter maintained immersed within the heated coating composition for a period sufficient to produce the desired coating thereon. As the mandrel cools from its initial temperature, preferably from about 350° to 370° F., to the temperature of the insulating composition, i.e., 105° to 115° F., the rate of growth of the coating on the mandrel surfaces decreases. If maintained in the coating composition for too great a period, it has been found that un-gelled material which has not sufficiently polymerized will be removed from the dip tank with the mandrel and produce runs and sags in the final product. The dipping time is therefore restricted to a period of less than about two minutes; it has been found that good results are obtained by maintaining the mandrel immersed within the insulating composition for a period of from about 30 seconds to about 2 minutes.

In order to determine the optimum duration of the immersion within the above range for the particular thermosetting dip-coating composition employed, a trial piece must be coated and the thickness checked with a probe. Since the viscosity of each insulating composition changes with the life of the material the dipping time must be varied accordingly. It is typical, however, to produce a 0.125 inch thick coating by a single dipping operation involving immersing the mandrel within the insulating composition at an entry rate of one foot per minute, maintaining the mandrel in the liquid body for a period of about one minute, and then withdrawing the mandrel at a rate of about one foot per minute. It has been found preferable to delay withdrawal of the final elements of the mandrel from the liquid body to permit the meniscus of the viscous liquid to produce a smooth edge over the coated surface without tear drop formation.

Upon removing the coated mandrel from the body of the resinous composition it is transferred to an oven or otherwise heated to a temperature of from about 350° F. to 380° F. to cure the thermosetting insulating coating thereon. It is preferred to cure the coating within a relatively short time after removal from the dip tank since hygroscopic agents present in the coating composition may, over a period of time, absorb water and produce a sub-standard insulation. It is therefore preferred to heat the coated mandrel to effect curing of the insulating coating thereon no more than 4 hours after removal of the mandrel from the dip tank.

The coated mandrel is maintained at the curing temperature of from about 350° to 380° F. for a period of from 30 to 120 mintues, preferably about one hour. It is thereafter removed from the oven and cooled, desirably by air cooling, to a temperature of from about 225° to 275° F. At this temperature the thermosetting insulating coating is sufficiently hardened to provide a configuration permitting its removal from the mandrel, while retaining sufficient flexibility so that the insulation formed can be readily peeled from the mandrel. The insulation is then finally cured completely at about 360° F. for 2 hours.

The following examples illustrate perferred embodiments of the method of the present invention; it will be appreciated that the invention is not limited to such examples.

EXAMPLE I

A thermosetting insulating formulation was made up of the following ingredients:

| | Parts by weight |
|---|---|
| Epoxy resin (which is a blend of 62.5% of the epoxy resin reaction product of Bisphenol A and epichlorohydrin, and 37.5% bis(2,3-epoxy cyclophenyl) ether, and commercially available as "Union Carbide No. 2258," a liquid resin having an epoxide equivalent of 140–160, and a viscosity of 500–900 cps. at 25° C.) | 100 |
| Silica filler (200 mesh) | 185 |
| $Sb_2O_3$ | 15 |
| Catalyst—dimethylaminomethyl phenol | 0.6 |
| Dodecenyl succinic anhydride | 140 |
| Polyvinyl chloride plastisol (Metal & Thermit 2906) | 210 |

A pigment ("Pemco NP-92") in the amount of 0.75% by weight of the above ingredients was added to the above formulation and the resulting admixture heated to a temperature of 110° F. in a dip tank. The mixture was slowly mixed employing an agitator rotating at 200 r.p.m.; a mandrel having external surfaces conforming to the shape of a puffer tube (having cylindrical side walls terminating in an outwardly flared portion) and heated to a temperature of 350° F. was then immersed in the insulating composition, terminating the agitation of the liquid upon dipping the mandrel therein.

A pigment ("Pemco NP-92") in the amount of 0.75% sulating composition for a period of one minute it was withdrawn and the coated mandrel allowed to cool to 250° F. in air.

The insulation thus formed was slid from the mandrel. The insulation was homogeneous and possessed excellent resistance to physical and chemical attack. It possessed a power factor of about 3% at 25° C.; 7% at 90° C.; 15% at 105° C.; and 30% at 120° C.

EXAMPLE II

A further insulating composition was made up of the following components:

| | Parts by weight |
|---|---|
| Epoxy resin (which is the reaction product of Bisphenol A and epichlorohydrin, commerically available as "Ciba No. 6005"; a liquid resin having an epoxide equivalent of 190 and a viscosity of 8,000 cps. at 25° C.) | 100 |
| Silica filler (200 mesh) | 185 |
| Catalyst—dimethylaminomethyl phenol | 1.5 |
| Methyl Nadic anhydride | 77 |
| Polyvinyl chloride plastiol (Metal & Thermit 2906) | 180 |

The insulating composition was heated to a temperature of 110° F. in a dip tank. The liquid body was slowly agitated and a mandrel having external surfaces conforming to the shape of a puffer tube, previously heated to a temperature of 350° F., was then immersed in the insulating composition, the agitation being terminated during the period of immersion.

After maintaining the mandrel immersed within the insulating composition for a period of one minute, it was withdrawn and the coated mandrel allowed to cool to 250° F. in air.

The insulation thus formed was slid from the mandrel. The insulation was homogeneous and possessed excellent resistance to physical and chemical attack.

In accordance with the present invention there is thus provided a novel dip-coating procedure for forming intricately shaped electrical insulation constituted of thermosetting resinous materials. Such procedure is relatively simple and economical to carry out and yet produces insulation in both rigid and flexible forms having uniformly satisfactory chemical, electrical and physical properties. Although the invention has been described above with respect to its preferred embodiments, it will be understood that many variations and modifications will be obvious to those skilled in the art. It is preferred therefore that the scope of the invention be limited not by the specific disclosure herein but only by the appended claims.

We claim:

1. A method of producing intricately shaped electrical insulation having a thickness of at least 150 mils in a single dip-coating operation, which comprises:
  (a) heating a liquid body of a thermosetting resinous coating composition to a temperature of from 105° to 115° F., said composition incorporating, as a resinous component therein, a polyvinyl halide plastisol admixed with an epoxy resin in the proportion of from 1.8 to 4.3 parts by weight of said plastisol per part of said epoxy resin;
  (b) agitating the liquid body;
  (c) immersing a mandrel pre-heated to a temperature greater than that of said liquid body, and having external surfaces corresponding to the configuration of the desired insulation into said liquid body while simultaneously terminating the agitation thereof in order to avoid entrapping air into the thermosetting coating formed upon said mandrel;
  (d) maintaining the mandrel immersed in the heated liquid body for a period of from 30 seconds to 2 minutes;
  (e) removing the thus coated mandrel from the liquid body and heating the mandrel at a temperature of from 350° F. to 380° F. for a period sufficient to partially cure the insulating coating thereon;
  (f) cooling the coated mandrel and removing the intricately shaped insulation therefrom; and
  (g) completing the cure of the thus formed insulation.

2. The method of producing intricately shaped electrical sheet insulation as defined in claim 1, in which the thermosetting coating composition contains up to 0.03 parts by weight of a catalyst, from 0.6 to 2.5 parts of a hardener, from 0.07 to 0.2 parts by weight of antimony trioxide, and from 1.5 to 2.2 parts by weight of a filler, per part of the thermosetting epoxy resin constituent thereof.

3. The method for producing intricately shaped electrical insulation as defined in claim 1, wherein the epoxy resin constitutent of the thermosetting coating composition is a mixture of from 50% to 75% by weight of an epoxy resin reaction product of a polyhydric phenol and an epihalohydrin, and from 25% to 50% by weight of a peracetic acid type epoxy resin having the formula

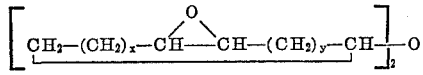

wherein $x$ and $y$ are each integers of from 0 to 4 and together equal from 1 to 4.

4. The method for producing intricately shaped electrical insulation as defined in claim 1, including the further steps of applying a mold release material to the mandrel and heating the mandrel to a temperature in the range of about 350° F. to 380° F. and prior to immersing the mandrel in the heated liquid body of the thermosetting resinous coating composition.

5. The method for producing intricately shaped electrical insulation as defined in claim 1, in which the coated mandrel is heated, in step (e), at a temperature of from 350° to 380° F. for a period of from 30 to 120 minutes to cure the thermosetting insulating coating thereon, and is thereafter cooled, in step (f), to a temperature of from 225° to 275° F. prior to removing the intricately shaped insulation from the mandrel.

References Cited

UNITED STATES PATENTS

| | | | |
|---|---|---|---|
| 2,717,216 | 9/1955 | Arone | 117—217 X |
| 2,773,043 | 12/1956 | Zukas | 260—837 X |
| 2,815,896 | 12/1957 | Shapero | 264—305 X |
| 2,966,701 | 1/1961 | Heller | 264—255 |
| 2,002,375 | 5/1935 | L'Hollier | 264—215 X |

OTHER REFERENCES

Modern Plastics Encyclopedia Issue for 1961 (published September 1960), Plastisol Molding, p. 765.

ROBERT F. WHITE, Primary Examiner

N. RUSHEFSKY, Assistant Examiner

U.S. Cl. X.R.

264—302, 304, 306